United States Patent [19]
Kawagoe

[11] Patent Number: 5,032,997
[45] Date of Patent: Jul. 16, 1991

[54] FAIL-SAFE VEHICLE CONTROL SYSTEM

[75] Inventor: Kenji Kawagoe, Tochigi, Japan

[73] Assignee: Nissan Motor Co., Ltd., Japan

[21] Appl. No.: 343,379

[22] Filed: Apr. 26, 1989

[30] Foreign Application Priority Data

Apr. 27, 1988 [JP] Japan ................................. 63-102367
Apr. 27, 1988 [JP] Japan ................................. 63-102368

[51] Int. Cl.⁵ ............................................. B62D 5/30
[52] U.S. Cl. ................... 364/424.05; 280/707; 180/140
[58] Field of Search ............ 364/424.01, 424.05; 180/140-142; 280/91, 747

[56] References Cited

U.S. PATENT DOCUMENTS

| 4,592,439 | 6/1986 | Collard et al. | 180/140 |
| 4,687,214 | 8/1987 | Uno | 280/91 |
| 4,715,466 | 12/1987 | Ishii et al. | 180/233 |
| 4,776,424 | 11/1988 | Naito | 180/233 |
| 4,782,907 | 11/1988 | Morishita et al. | 180/140 |
| 4,826,205 | 5/1989 | Kouda et al. | 280/703 |
| 4,886,291 | 12/1989 | Okamoto | 280/707 |

FOREIGN PATENT DOCUMENTS

| 05189 | 1/1987 | European Pat. Off. . |
| 208992 | 1/1987 | European Pat. Off. . |
| 311098 | 4/1989 | European Pat. Off. . |
| 3819837 | 1/1989 | Fed. Rep. of Germany . |

Primary Examiner—Thomas G. Black
Attorney, Agent, or Firm—Leydig, Voit & Mayer

[57] ABSTRACT

A fail-safe control unit for a vehicle having a first control system for controlling a steer angle and a second control system for controlling a condition of the vehicle, such as a driving force distribution in a 4WD system, or a damping characteristic of a suspension system. When one of the first and second control systems becomes abnormal, and the other remains normal, the fail-safe control unit adjusts the normal control system so as to maintain or improve the directional stability of the vehicle notwithstanding the failure of the abnormal system.

19 Claims, 11 Drawing Sheets

FAIL-SAFE VEHICLE CONTROL SYSTEM

BACKGROUND OF THE INVENTION

The present invention relates to a system for controlling a vehicle having a steer angle control system and another vehicle control system, such as a 4WD control system or a suspension control system, for controlling a condition of the vehicle affecting a handling characteristic of the vehicle.

Recently, many publications have disclosed various 4WS control systems, 4WD control systems and suspension control systems.

Some examples of 4WS control are disclosed in U.S. Pat. No. 4,705,131, Japanese Patent Provisional Publication No. 60-229873, and Japanese Utility Model Provisional Publication No. 62-23773.

Some examples of 4WD control are disclosed in U.S. Pat. No. 4,757,870, No. 4,754,834, No. 4,773,500 and No. 4,776,424, and "Seigyo Riron no Ohyo to Jidosha no Seigyo" (Application of Control Theory and Control of Automobile), Symposium of Society of Automotive Engineers of Japan, p41, published in 1986. The 4WD system disclosed in the last-named Japanese document is mounted on a NISSAN CUE-X concept car. The 4WD system of that document is an electronically controlled torque split, full-time 4WD system having a hydraulic multiple-disc clutch in a drive path for front wheels. A controller controls the torque capacity of the multiple disc clutch by varying an applied clutch fluid pressure. The driving force distribution ratio of the front wheel driving force to the rear wheel driving force is approximately $Tc: (T-Tc)$, where $Tc$ is the torque capacity of the multiple disc clutch, and $T$ is the transmission output torque. Therefore, the controller controls the torque capacity $Tc$ to provide an optimum front wheel and rear wheel driving torque distribution in accordance with signals of wheel speed sensors and an accelerator position sensor.

The Mitsubishi Galant is an example of a vehicle combining the 4WS system and the 4WD system.

An example of suspension control is disclosed in "T12 NISSAN Sahbisu Shuho" (NISSAN Service Bulletin), pages C-7, C-9 and C-10, published by NISSAN Motor Co., Ltd. October, 1985.

Some of the above-described control systems are equipped with a fail-safe means for detecting a failure, and electronically or mechanically adjusting an abnormal system in which the failure is detected so as to maintain the safety of the vehicle.

However, conventional fail-safe control systems are unsatisfactory in that no consideration is given to the influence of a failure of one control system on another control system in the same vehicle. In general, a vehicle having a second vehicle control system such as a 4WD control system or a suspension control system in addition to a 4WS control system, is tuned to have optimum vehicle characteristics when both control systems are normal and functioning properly. Therefore, the vehicle stability becomes worse when one control system is brought to a stop because of its failure.

SUMMARY OF THE INVENTION

It is an object of the present invention to provide a fail-safe vehicle control system which can more reliably protect the stability of a vehicle having two different control systems, against failures in the control systems.

It is another object of the present invention to provide a vehicle having a steering control system, a second vehicle control system such as a 4WD control system or a suspension control system, and a fail-safe means which can protect the vehicle stability against failures in the control systems by controlling not only the control system which becomes abnormal, but also the control system which remains normal.

According to the present invention, a vehicle comprises a first control system, a second control system, and fail-safe means. The first control system comprises a steering system for steering the vehicle, and a first controlling means for controlling a condition of the steering system. For example, the first controlling means is arranged to control a rear wheel steer angle of the vehicle. The second control system comprises a drive system for driving the vehicle, a suspension system for supporting a vehicle body on wheels of the vehicle, and a second controlling means for controlling a condition of at least one of the drive system and the suspension system. For example, the second controlling means controls a driving force distribution between front wheels and rear wheels, or a suspension characteristic of the suspension system. The fail-safe means is connected with the first and second control systems, and arranged to adjust the first control system when a failure is detected in the second control system, and to adjust the second control system when a failure is detected in the first control system.

DETAILED DESCRIPTION OF THE INVENTION

Figure 11:
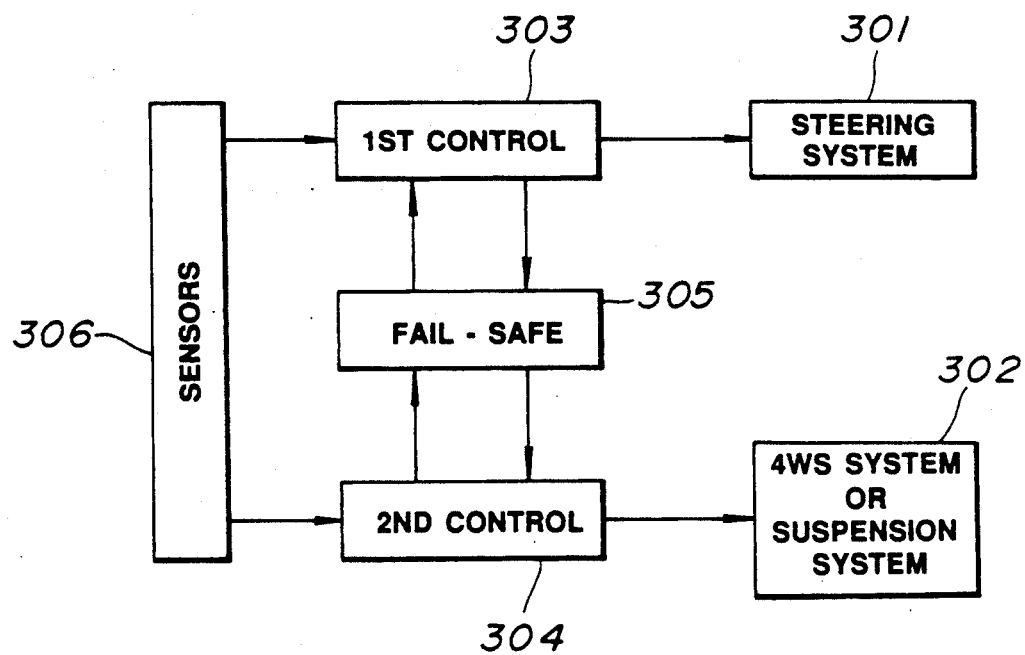
FIG. 11 is a block diagram for showing a basic arrangement of a control system of the present invention.

As shown in FIG. 11, a vehicle of the present invention has a steering system 301, a second system 302 such as a 4WD system or a suspension system, a first controlling means 303 for controlling the steering system, a second controlling means 304 for controlling the second system 302, and a fail-safe means 305 for adjusting a first control system constituted by the first controlling means 303 and the steering system 301 and a second control system constituted by the second controlling means 304 and the second system 302 when a failure is detected in the first or second control system. The vehicle may further comprise various sensors 306 for sensing vehicle operating conditions and providing necessary information to the first and second control systems.

A first embodiment of the present invention is shown in FIGS. 1-5.

Figure 1:
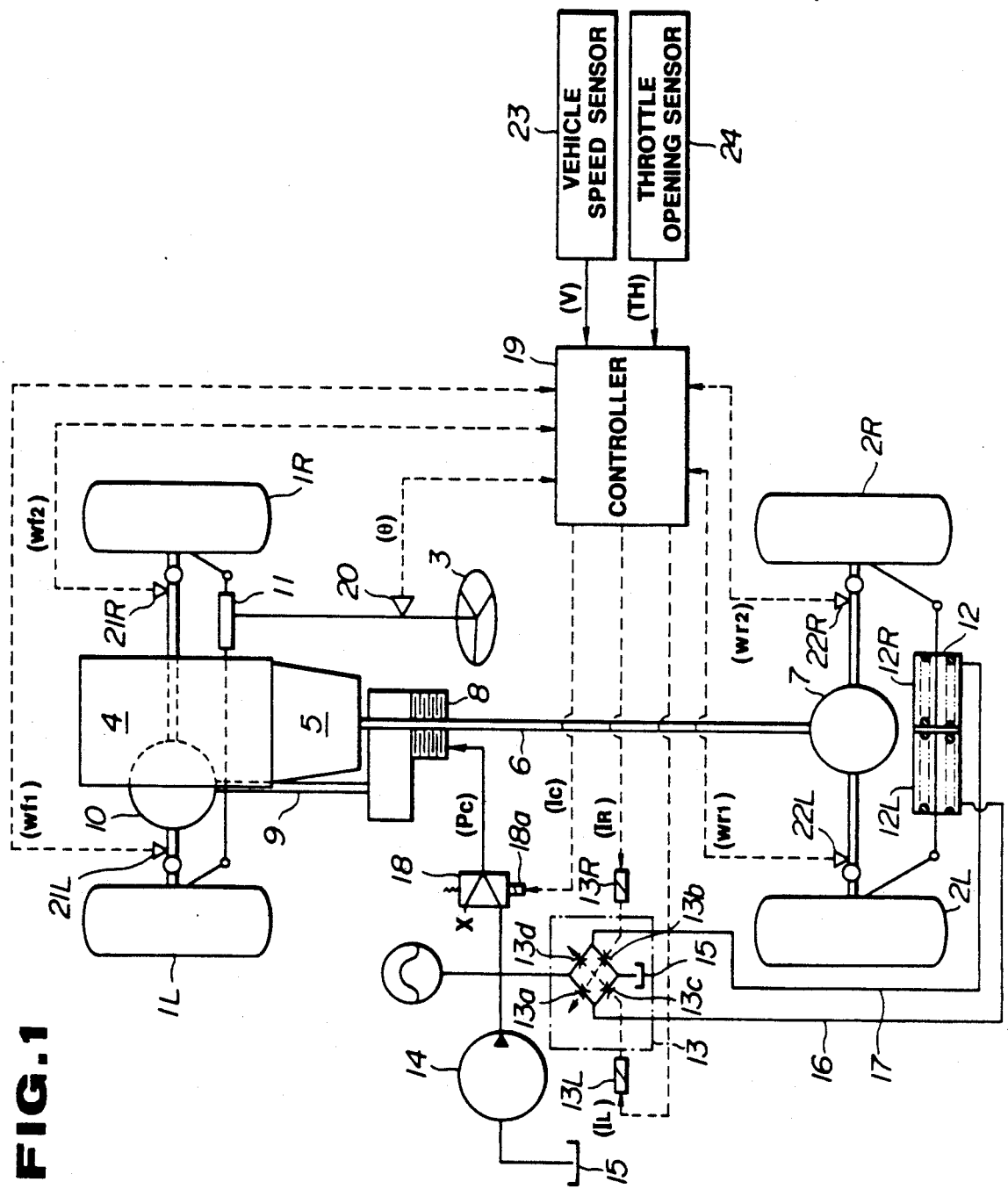
FIG. 1 is a schematic view of a vehicle equipped with a first embodiment of the invention.

A vehicle shown in FIG. 1 has a drive system and a rear wheel auxiliary steering system which are substantially the same as those shown in Japanese Patent Application No. 63-33892. As shown in FIG. 1, the vehicle has left and right front wheels 1L and 1R, left and right rear wheels 2L and 2R, and a steering wheel 3.

The drive system shown in FIG. 1 includes an engine 4, a transmission 5, a rear drive line which always connects the rear wheels 2L and 2R with an output member of the transmission 5, and a front drive line capable of controlling the amount of driving torque transmitted from the transmission 5 to the front wheels 1L and 1R. The rear drive line includes a rear propeller shaft 6 which is always connected with the transmission 5, and a rear differential 7. The front drive line includes a front drive clutch 8, a front propeller shaft 9, and a front differential 10.

The steering system of the vehicle includes a steering gear 11 connected between the steering wheel 3 and the front wheels 1L and 1R so that the front wheels 1L and 1R can be steered by the steering wheel 3 in a conventional manner, and a rear wheel steering actuator 12 for steering the rear wheels 2L and 2R.

The rear wheel steering actuator 12 of this embodiment is a spring center type hydraulic actuator. When oil pressure is supplied to a right chamber 12R of the actuator 12, the actuator 12 steers the rear wheels 2L and 2R to the right by an angle proportional to the oil pressure. When the oil pressure is supplied to a left chamber 12L, the actuator 12 steers the rear wheels 2L and 2R to the left by an angle proportional to the oil pressure.

A rear wheel steering control valve 13 of an electromagnetic proportional type is connected with the actuator 12, and arranged to control the oil pressures of the left and right chambers 12L and 12R of the actuator 12. The control valve 13 has four variable orifices 13a, 13b, 13c and 13d which are connected in a bridge circuit as shown in FIG. 1. The four modes of the bridge circuit are connected, respectively, with a pump 14, a reservoir 15, a left oil passage 16 leading to the left chamber 12L of the actuator 12, and a right oil passage 17 leading to the right chamber 12R of the actuator 12. The control valve 13 further includes left and right solenoids 13L and 13R. When both solenoids are off, one opposite orifice pair 13a and 13b and the other opposite orifice pair 13c and 13d are both fully opened so that both chambers 12L and 12R are put in a non-pressurized state (an equilibrium state). When the solenoid 13L or 13R is energized by a left solenoid current $I_L$ or a right solenoid current $I_R$, then orifice pair 13c and 13d or orifice pair 13a and 13b is closed to a reduced opening corresponding to the magnitude of the solenoid exciting current $I_L$ or $I_R$, so that the oil pressure corresponding to the current $I_L$ or $I_R$ is supplied to the power chamber 12L or 12R of the actuator 12.

An electromagnetic proportional pressure regulating valve 18 is connected with the front wheel drive clutch 18 and controls the clutch pressure Pc supplied to the front drive clutch 8. The front drive clutch 8 transmits a driving torque corresponding to the clutch pressure Pc to the front wheels 1L and 1R. The regulating valve 18 normally holds the clutch pressure Pc equal to zero. As a current $I_C$ for energizing a clutch control solenoid 18a of the valve 18 is increased, the clutch pressure regulating valve 18 increases the clutch pressure Pc by admitting the output pressure of the pump 14 to the clutch 8.

A controller 19 is provided for controlling the exciting currents $I_L$, $I_R$ and $I_C$ of the solenoids 13L, 13R and 18a.

Various sensors are connected with the controller 19. In this embodiment, the sensors are a steering angle sensor 20 for sensing a steering angle $\theta$, wheel speed sensors 21L, 21R, 22L and 22R for sensing the rotational speeds wf1, wf2, wr1 and wr2 of the wheels 1L, 1R, 2L and 2R, respectively, a vehicle speed sensor 23 for sensing the vehicle speed V, and a throttle opening sensor 24 for sensing the throttle opening degree TH. The steering angle sensor 20 of this embodiment is a sensor for sensing the steering wheel angle $\theta$ of the steering wheel 3. Output signals of these sensors are input to the controller 19.

Figure 2:
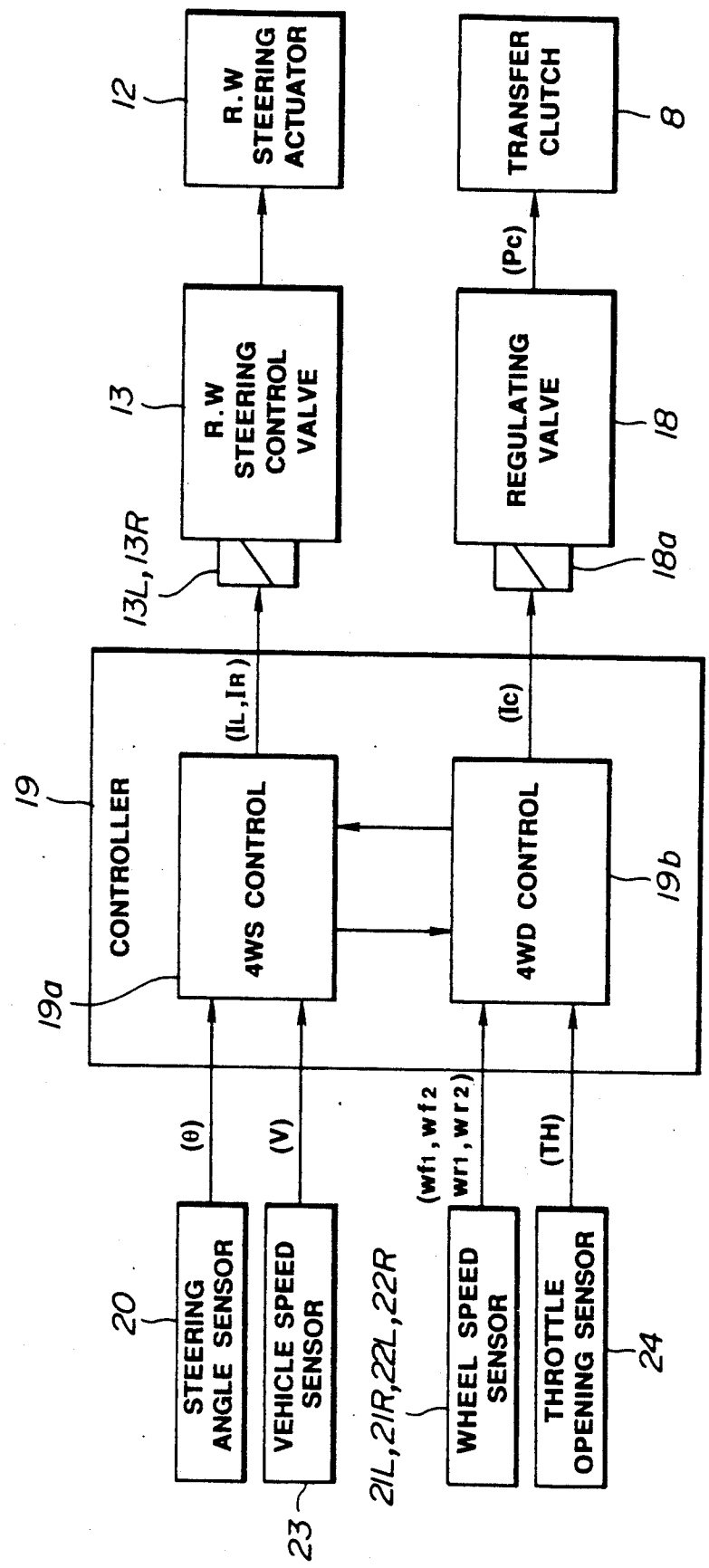
FIG. 2 is a block diagram of the first embodiment of a vehicle control system.

As shown in FIG. 2, the controller 19 of this embodiment has a 4WS control section 19a and a 4WD control section 19b.

Figure 3:
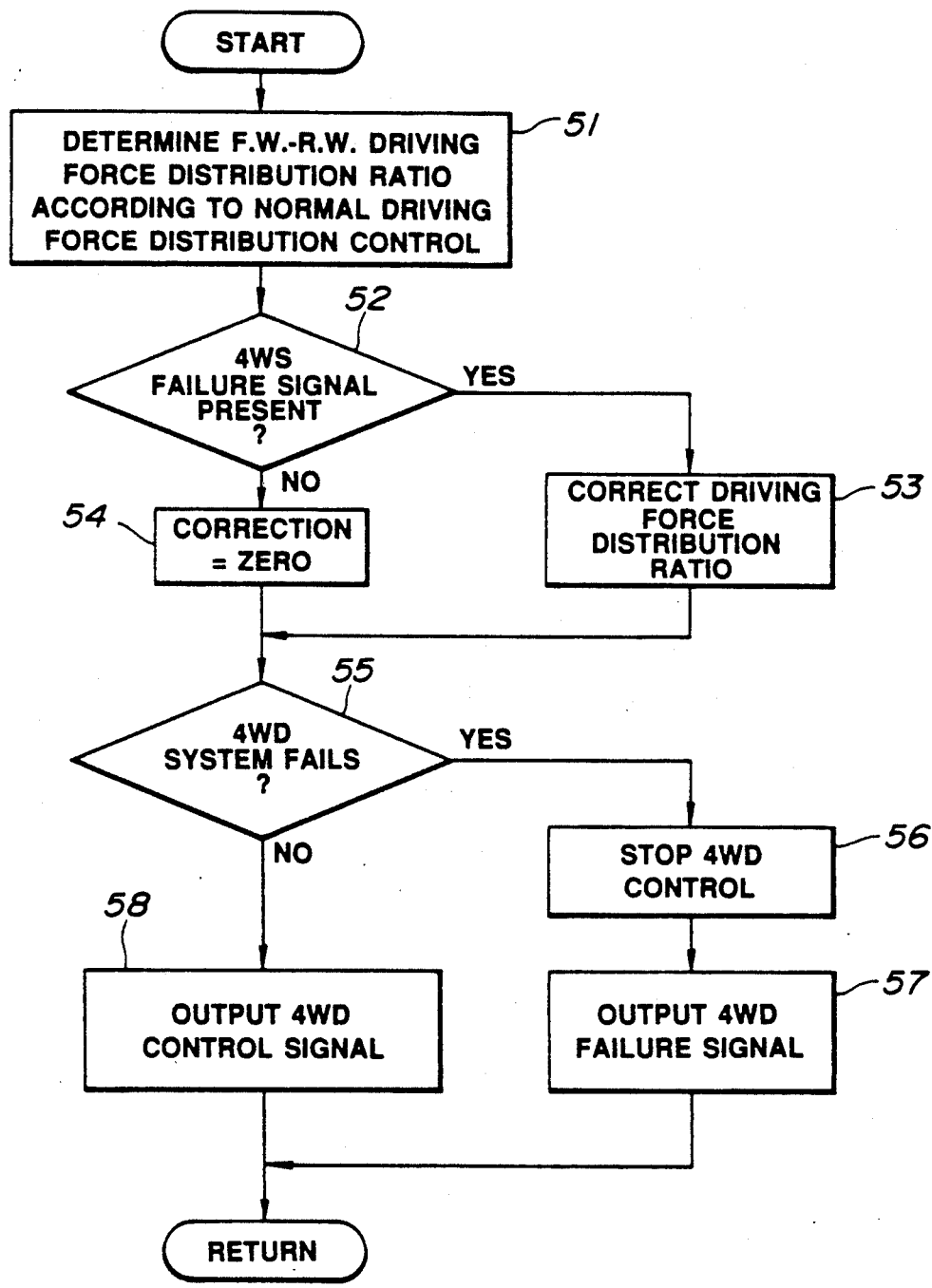
FIG. 3 is a flow chart showing a 4WD control procedure of the first embodiment.
Figure 4:
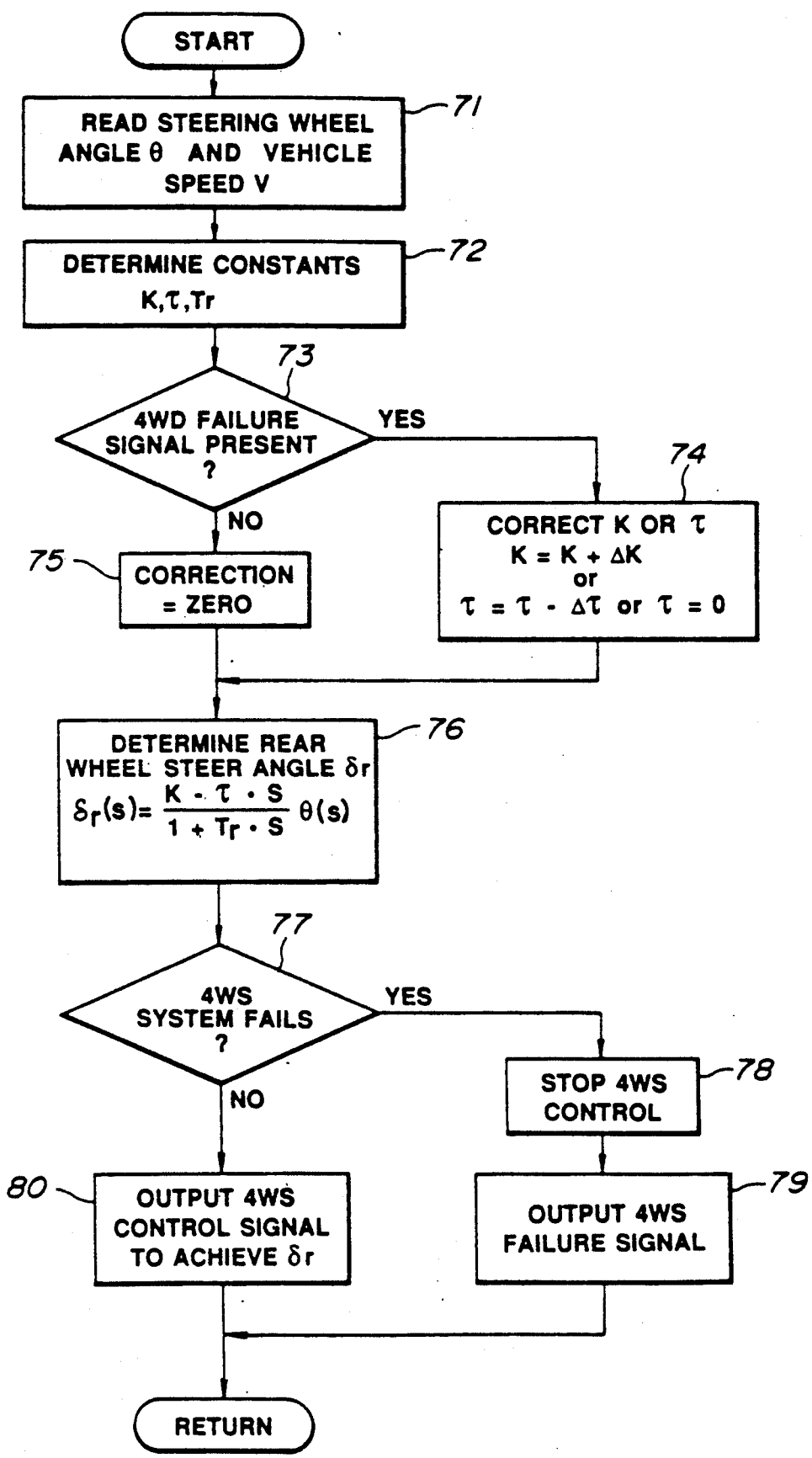
FIG. 4 is a flow chart showing a 4WS control procedure of the first embodiment.

FIG. 3 shows a driving force distribution control procedure of this embodiment, and FIG. 4 shows a rear wheel steer angle control procedure. The controller 19 periodically repeats each of the control procedures.

In step 51 of FIG. 3, the controller 19 determines a desired front wheel and rear wheel driving force distribution ratio in accordance with a predetermined normal control mode. In this embodiment, the distribution ratio is determined by using the signals of the wheel speed sensors 21L, 21R, 22L and 22R and the throttle opening sensor 24, as in the NISSAN CUE-X concept car (disclosed in Symposium of Society of Automotive Engineers of Japan "Seigyo Riron no Ohyo to Jidosha no Seigyo" (Application of Control Theory and Automobile Control), page 41, 1986). In the present invention, it is possible to employ any one of various front and rear wheel driving force distribution control systems. Some examples are disclosed in U.S. Pat. No. 4,757,870, No. 4,754,834, No. 4,773,500 and 4,776,424.

In step 52, the controller 19 determines whether a 4WS failure signal is present or not. If it is, then the controller 19 proceeds from step 52 to step 53, and from step 53 to step 55. In step 53, the controller 19 corrects the front and rear wheel driving force distribution ratio so as to increase the driving force transmitted to the front wheels relative to the driving force of the rear wheels. If the 4WS failure signal is not present, then the controller 19 proceeds from step 52 to step 55 by way of step 54. In step 54, the controller 19 sets a correction equal to zero so that the desired front and rear wheel driving force distribution ratio determined in step 51 remains unchanged.

In step 55, the controller 19 determines whether a failure is present in the sensors and solenoid used in the 4WD control to determine whether the 4WD control system is functioning properly. If the 4WD control system is not normal, then the controller 19 proceeds from step 55 to step 56 to stop the 4WD control, and then to step 57 to deliver a 4WD failure signal to the 4WS control section 19a.

If no failure is detected in the 4WD control system, then the controller 19 proceeds from the step 55 to step 58. In step 58, the controller 19 outputs a 4WD control signal to achieve the front and rear wheel driving torque distribution ratio determined in step 53 or 54. In this embodiment, the 4WD control signal is the solenoid exciting current $I_C$, which is sent to the solenoid 18a of the electromagnetic pressure regulating valve 18 to perform duty factor control. After step 57 or 58, the controller 19 returns to step 51 to repeat a sequence of operations shown in FIG. 3.

When the 4WS control system is abnormal and the 4WD control system is normal, the fail-safe control system of this embodiment increases the driving force distribution ratio, which is the ratio of the driving force transmitted to the front wheels to the driving force transmitted to the rear wheels, so that the understeer tendency is increased and the vehicle stability is improved.

The 4 wheel steering control procedure of this embodiment is shown in FIG. 4.

In step 71, the controller 19 reads the current values of the steering wheel angle $\theta$ and the vehicle speed V.

In step 72, the controller 19 determines values of a rear wheel steering proportional gain (or constant) K and a rear wheel steering derivative gain (or constant) $\tau$(tau) by using the current value of the vehicle speed V. The proportional gain K and the derivative gain $\tau$(tau) are functions of the vehicle speed V which are determined so as to provide the ideal vehicle dynamic characteristics in which the characteristic of the yaw rate gain with respect to the steering frequency is flat so that the yaw rate is produced in proportion to the front wheel steering amount independently of the steering speed without phase delay. Then, the controller 19 determines a rear wheel steering time constant Tr by using the following equation (1):

$$Tr = (\tau/K)/A \qquad (1)$$

where A is a constant from 2 to 3.

In step 73, the controller 19 determines whether the 4WD failure signal is present or not to determine whether the 4WD system is abnormal or not. If the 4WD system is abnormal, then the controller 19 proceeds from step 73 to step 74. In step 74, the controller 19 increases the proportional gain K by $\Delta K$ (Delta K) (i.e., $K = K + \Delta K$), or decreases the derivative gain $\tau$(tau) by $\Delta \tau$(Delta tau) (i.e., $\tau = \tau - \Delta \tau$), or decreases the derivative gain $\tau$(tau) to zero (i.e., $\tau = 0$). After step 74, the controller 19 proceeds to step 76. If the 4WD system is normal, and hence the answer in step 73 is negative, then the controller 19 proceeds from step 73 to step 75. In step 75, the controller 19 sets a correction quantity equal to zero, so that the constants K, $\tau$(tau) and Tr remain unchanged. Then, control is transferred from step 75 to step 76.

In step 76, the controller 19 determines a rear wheel steer angle $\delta_r$ by using the values of the constants K, $\tau$, Tr obtained in steps 72, 74 and 75. In this embodiment, the rear wheel steer angle is calculated by the following equation (2):

$$\delta_r(s) = \frac{k - \tau s}{1 + Trs} \theta(s) \qquad (2)$$

where $\delta_r(S)$ is the Laplace transform of the rear wheel steer angle and s is a Laplace transform variable. Instead of the equation (2), it is possible to employ one of various other equations such as;

$$\delta_r = K\theta \text{ (proportional control);} \qquad (i)$$

$$\delta_r(s) = \frac{k}{1 + Trs} \theta(s) \text{ (first order lag);} \qquad (ii)$$

$$\delta_r(s) = (k - \tau s)\theta(s) \text{ (first order lead)} \qquad (iii)$$

$$\delta_r(s) = \frac{B_f}{B_r} \cdot \frac{1 + \tau_f s}{1 + \tau_r s} \delta_r(s) \qquad (iv)$$

where $B_f$, $B_r$, $\tau_f$ and $\tau_r$ are functions of the vehicle speed and $\delta_r(s)$ is the Laplace transform of the front wheel steer angle (the front and rear wheel steer angle ratio is in the form of first-order/first-order.

In step 77, the controller 19 determines whether the 4WS system is abnormal or not by determining whether a failure is detected in the sensors and solenoids used in the 4WS control. If a failure is detected in the 4WS system, then the controller 19 stops the 4WS control in step 78, and delivers the 4WS failure signal to the 4WD control section 19b.

If the 4WS system is normal, the controller 19 performs 4WS control in step 80 by outputting a 4WS control signal to achieve the rear wheel steer angle $\delta_r$ obtained in step 76. In this embodiment, the controller 19 delivers the exciting currents $I_L$ and $I_R$ to the solenoids 13L and 13R in step 80. After step 79 or 80, the controller 19 returns to step 71 to repeat the procedure of FIG. 4.

When the 4WD control system is abnormal and the 4WS control system is normal, then the fail-safe control system of this embodiment varies the rear wheel steer angle in such a direction as to increase the amount of same-direction rear wheel steering by which the rear wheels are steered in the same direction as the steering direction of the front wheels, or to decrease the amount of opposite-direction rear wheel steering by which the rear wheels are steered in the direction opposite to the steering direction of the front wheels. Therefore, the control system can maintain or improve the vehicle stability by increasing the understeer tendency.

The directional stability of a vehicle can be expressed by a static stability $dM/d\beta$ (where M is a static restoring yaw moment and $\beta$ is an attitude angle), as disclosed in "Kiso Jidosha Kogaku (second volume)", pages 29-39, written by KONDO, published June, 1979. The static stability is given by $$dM/d\beta = (l_1 T + l_2 T)\alpha + C_1 l_1 - C_2 l_2 - l_2 T \qquad (3)$$

where T is the total driving force of the vehicle, $\alpha$ (alpha) is the ratio of the front wheel driving force to the total driving force, and $l_1$, $l_2$, $C_1$ and $C_2$ are constants determined by the specifications of the vehicle. When the stability $dM/d\beta$ is greater than zero, the vehicle is directionally stable (This characteristic corresponds to the understeer tendency.). When the static stability $dM/d\beta$ is smaller than zero, the vehicle is unstable (an oversteer tendency). Therefore, when the total driving force T is positive, the static stability $dM/d\beta$ increases, and the understeer tendency increases with increase of the share $\alpha$(alpha) of the driving force alloted to the front wheels. In view of this, the control system of this embodiment is arranged to increase the vehicle stability by increasing the share of the driving force alloted to the front wheels when the 4WS system is abnormal.

When the 4WD system becomes abnormal and the clutch is disengaged as in the above-mentioned NISSAN CUE-X, the share of the front wheel driving force is reduced to zero, and the share of the rear wheel driving force is increased to 100% (two rear wheel drive mode), so that the vehicle stability becomes worse. In contrast to this, the control system of this embodiment is arranged to prevent the vehicle stability from being decreased by the failure of the 4WD system by utilizing the 4WS control system. When the proportional gain K is increased in step 74, the steady state gain and phase delay of the yaw rate are changed from the solid line characteristic curves to the curves shown with short dashes in FIG. 5, so that the damping of the yaw rate is improved, and the stability is increased so as to compensate for the influence of the failure of the 4WD system. Furthermore, it is possible to improve the vehicle stability by decreasing the derivative gain $\tau$(tau) (though the steering response gain is somewhat decreased).

Figure 5:
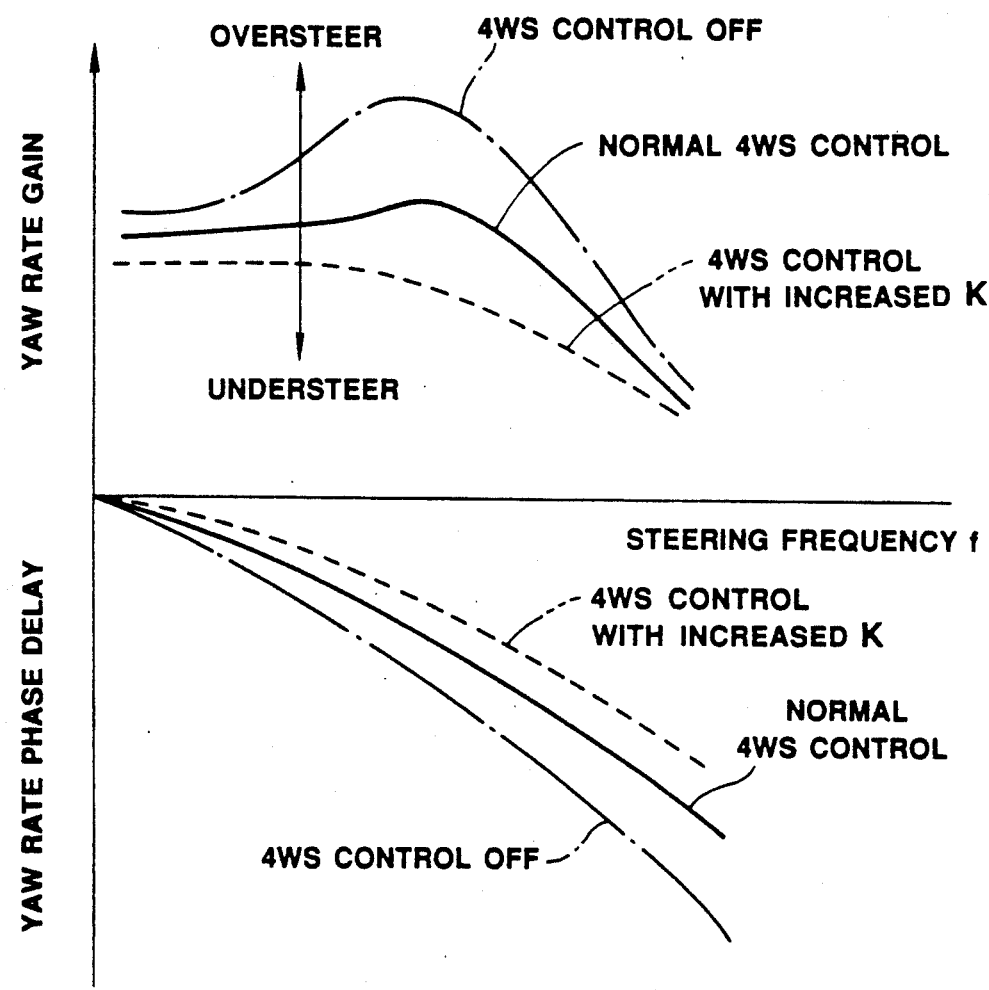
FIG. 5 is a graph showing steering response characteristics obtained by the first embodiment.

When the 4WS system becomes abnormal and the steering mode is reduced to the two wheel steering mode, the understeer tendency is decreased and the steering response gain is enhanced as shown by the curves in FIG. 5 with alternating long and short dashes. As a result, the driver has an unnatural feeling. The control system of this embodiment can prevent such an unnatural feeling by increasing the share of the driving force alloted to the front wheels.

A second embodiment of the present invention is shown in FIGS. 6–10.

Figure 6:
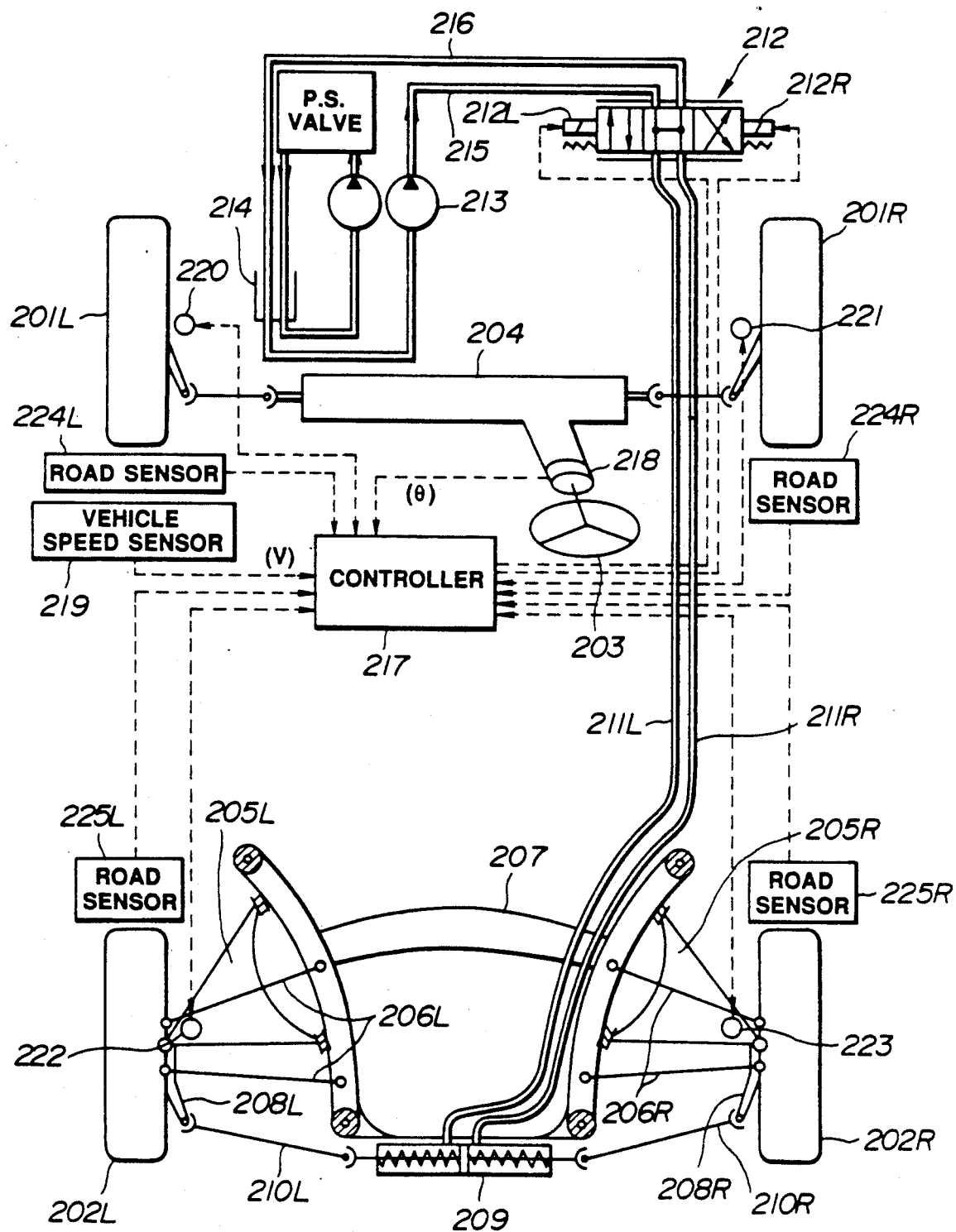
FIG. 6 is a schematic view of a vehicle equipped a second embodiment of the invention.

A vehicle shown in FIG. 6 has a rear wheel auxiliary steering system and a suspension system which are substantially the same as those shown in Japanese Patent Application No. 63-22686. As shown in FIG. 6, the vehicle has front wheels 201L and 201R, rear wheels 202L and 202R, and a steering wheel 203.

The steering system of the vehicle includes a steering gear 204 connected between the steering wheel 203 and the front wheels 201L and 201R so that the front wheels are steerable through the steering gear 204 in the conventional manner. In this steering system, the front wheel steer angle $\delta_f$ is determined by the steering wheel angle $\theta$ and the steering gear ratio N, as $\delta_f = \theta/N$.

A rear suspension system includes left and right transverse links 205L and 205R, and left and right upper arms 206L and 206R. The rear wheels 202L and 202R are connected with a rear suspension member 207 of the vehicle body through the rear suspension system in such a manner that the rear wheels are steerable. An actuator 209 for steering the rear wheels is provided between knuckle arms 208L and 208R of the left and right rear wheels 202L and 202R. Both ends of a piston rod of the rear wheel steering actuator 209 are connected with the knuckle arms 208L and 208R through left and right side rods 210L and 210R.

The rear wheel steering actuator 209 of this embodiment is a spring center type double acting hydraulic actuator. Left and right power chambers of the actuator 209 are connected with an electromagnetic proportional pressure control valve 212, respectively, through left and right fluid passages 211L and 211R. The control valve 212 is further connected with a pressure supply passage 215 and a drain passage 216 of a pressure source including a pump 213, and a reservoir 214. There is further provided a power steering control valve (P.S. valve).

The pressure control valve 212 has left and right solenoids 212L and 212R, and is connected with a controller 217 which controls exciting currents $I_l$ and $I_R$ of the solenoids 212L and 212R. When the controller 217 stops supplying the currents $I_L$ and $I_R$ and holds both solenoids off, the control valve 212 makes the pressures of the left and right power chambers of the actuator 209 equal to each other. Therefore, the actuator 9 is held in an equilibrium state and performs no steering action. When the left solenoid 212L is energized by the current $I_L$, the control valve 212 increases the pressure of the left power chamber of the actuator 209 by an amount proportional to the magnitude of the exciting current $I_L$. Therefore, the actuator 209 steers the rear wheels 202L and 202R to the left. When the controller 217 energizes the right solenoid 212R by the current $I_R$, then the control valve 212 increases the pressure of the right power chamber of the actuator 209 by an amount proportional to the magnitude of the current $I_R$ and accordingly the actuator 209 steers the rear wheels 202L and 202R to the right.

The controller 217 is connected with a steering angle sensor 218 for sensing the steering wheel angle $\theta$ of the steering wheel 203 and a vehicle speed sensor 219 for sensing the vehicle velocity V.

Figure 7:
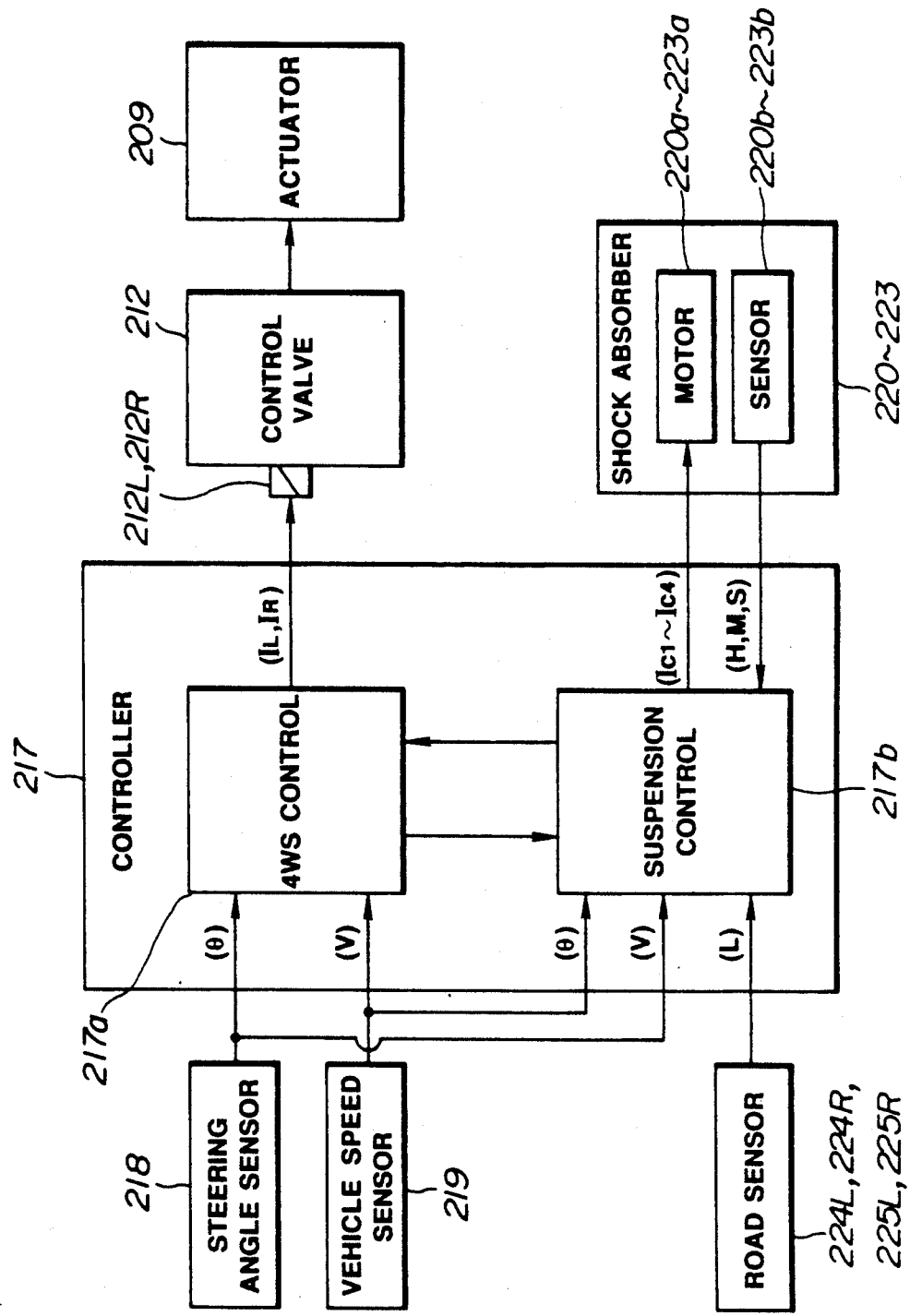
FIG. 7 is a block diagram of the second embodiment of a vehicle control system.
Figure 8:
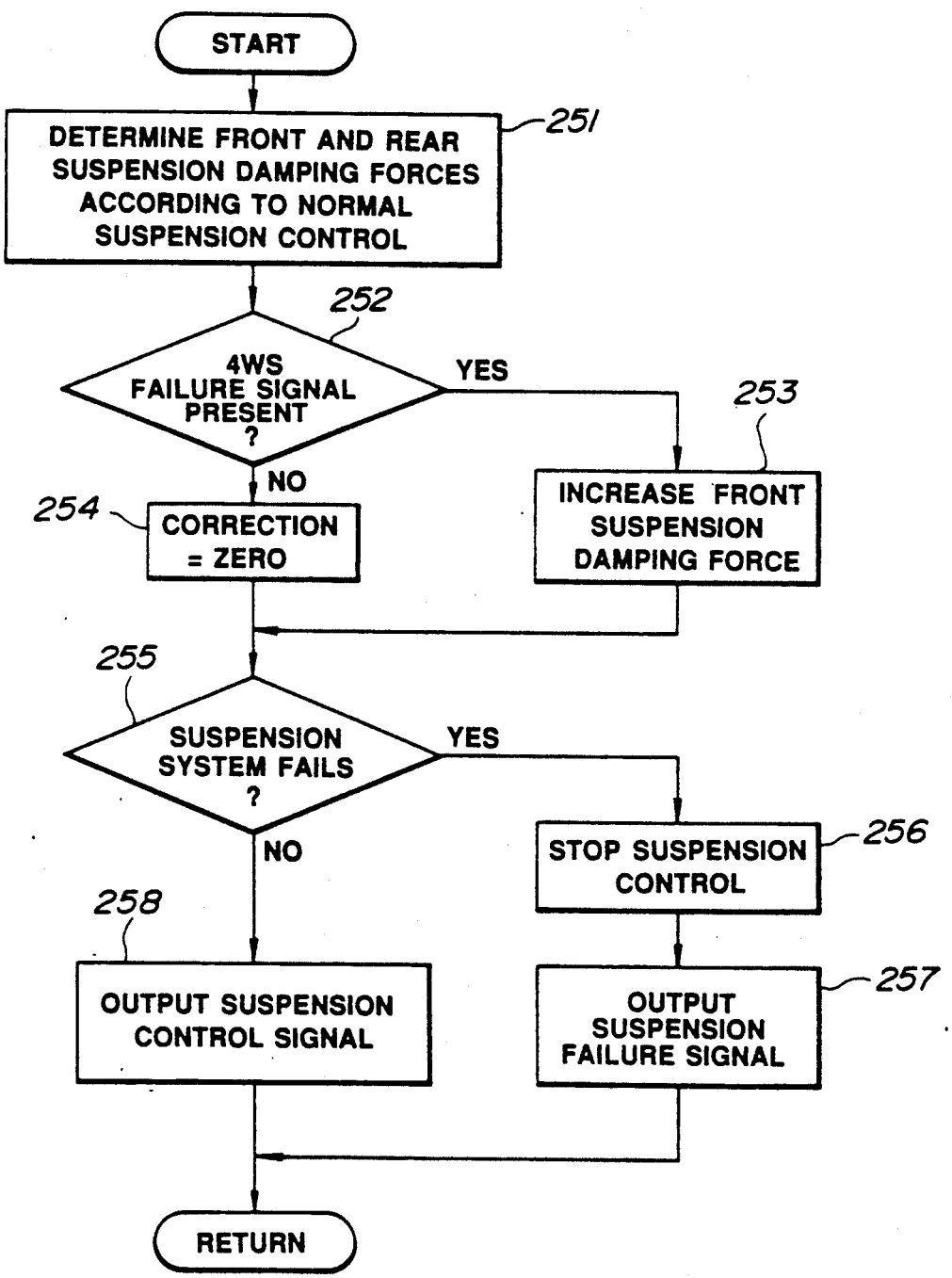
FIG. 8 is a flow chart showing a suspension control procedure of the second embodiment.

The suspension system of this vehicle has adjustable shock absorbers 220, 221, 222 and 223 which are provided, respectively, for the left and right front wheels 201L and 201R and the left and right rear wheels 202L and 202R. The four wheels 201L, 201R, 202L and 202R are independently attached to the vehicle body. Each shock absorber has a motor 220a, 221a, 222a or 223a for adjusting a suspension damping characteristic, and a shock absorber sensor 220b, 221b, 222b or 223b, as shown in FIG. 7. The controller 217 is connected with each motor, and arranged to control each of motor driving currents $I_{c1}$, $I_{c2}$, $I_{c3}$ and $I_{c4}$ of the damping characteristic adjusting motors 220a–223a. By controlling the rotation of the adjusting motor, the controller 217 can adjust the damping characteristic, such as a suspension damping force, of each shock absorber, individually.

In this embodiment, each shock absorber is adjusted to one of three damping modes, a hard mode (H), a medium mode (M) and a soft mode (S). The controller 217 of this embodiment adjusts the shock absorbers to the H mode when the vehicle velocity becomes low (when the vehicle is at rest, for example), or when the angular speed $\dot{\theta}$ of the steering wheel becomes high. When the road condition is bad (when the distance L between the vehicle body and the road surface is outside a predetermined range), then the controller 217 of this embodiment adjusts the front shock absorbers to the M mode, and the rear shock absorbers to the S mode. Each shock absorber sensor is arranged to sense a condition of the associated shock absorber to discriminate the H, M and S damping modes.

In the embodiment, four road surface sensors 224L 224R and 225L and 225R are provided, respectively, near the left and right front wheels 201L and 201R and the left and right rear wheels 202L and 202R. The road surface sensors of this embodiment are of an ultrasonic type. Each road surface sensor has an ultrasonic transmitter and receiver, and measures the distance L between the vehicle body and the road surface by measuring the time interval between transmission of an ultrasonic wave and reception of the reflected wave.

The controller 217 is connected with the steering angle sensor 218, the vehicle speed sensor 219, the shock absorber sensors 220b–223b and the road surface sensors 224L, 224R and 225L and 225R. The controller 217 periodically performs a suspension control procedure shown in FIG. 8 for controlling the motor driving currents $I_{c1}$, $I_{c2}$, $I_{c3}$, and $I_{c4}$ of the shock absorbers, and a rear wheel steering control procedure shown in FIG. 9.

As shown in FIG. 7, the controller 217 of this embodiment has a 4WS control section 217a, and a suspension control section 217b.

In step 251 of the suspension control, the controller 217 uses the steering angle $\theta$ (the steering angular speed $\dot{\theta}$), the vehicle velocity V, the distances L between the vehicle body and the road surface, and the conditions of the shock absorbers, and determines optimum front and rear suspension damping forces suited to the driving conditions and road conditions. It is possible to employ various suspension control strategies. Some examples are disclosed in U.S. Pat. Nos. 4,616,848, 4,733,883 and 4,717,173.

In step 252, the controller 217 determines whether a 4WS failure signal is present or not to determine whether the 4WS system is abnormal or not. If the 4WS failure signal is present, then the controller 217 proceeds from a step 252 to step 253 and increases the front wheel suspension damping force by one step. For example, the front wheel suspension damping force is increased from the level of the medium damping mode to the level of the hard damping mode, or from the level of the soft mode to the level of the medium mode. Then, the controller 217 proceeds from step 253 to step 255. If the 4WS system is normal, then the controller 217 proceeds from step 252 to step 255 by way of step 254. In step 254, the controller 217 sets a correction quantity equal to zero, so that the front and rear wheel suspension damping forces remain unchanged at values determined in step 251.

In step 255, the controller 217 determines whether there is a failure in the suspension control system by detecting a failure in the sensors and actuators used for the suspension contrtol. If the suspension system is abnormal, then the controller 217 proceeds from step 255 to steps 256 and 257. The controller 217 stops the suspension control in step 256, and delivers a suspension failure signal in 4WS control section 219a at the step 257.

If the suspension system is normal, then the controller 217 proceeds from step 255 to step 258 to output a suspension control signal. In this embodiment, the controller 217 delivers the motor driving currents $I_{c1}$, $I_{c2}$, $I_{c3}$ and $I_{c4}$, respectively, in shock absorber adjusting motors 220a-223a at the step 258. Therefore, each shock absorber is adjusted to the level of the damping force (H or M or S) determined in steps 251 and 253 or steps 251 and 254. After step 257 or 258, the controller 217 returns to step 251.

In this way, this control system makes the front suspension damping characteristic harder when the 4WS system is abnormal and the suspension system is normal. Therefore, this control system maintains or improves the vehicle stability in spite of the failure of the 4WS system by increasing the understeer tendency by means of the suspension control system. The present invention is applicable to a vehicle having a variable stabilizer bar or a suspension system adjusting a spring constant. In this case, the fail safe system is arranged to increase the roll stiffness distribution on the front wheels' side when the 4WS system is abnormal and the suspension system is normal.

Figure 9:
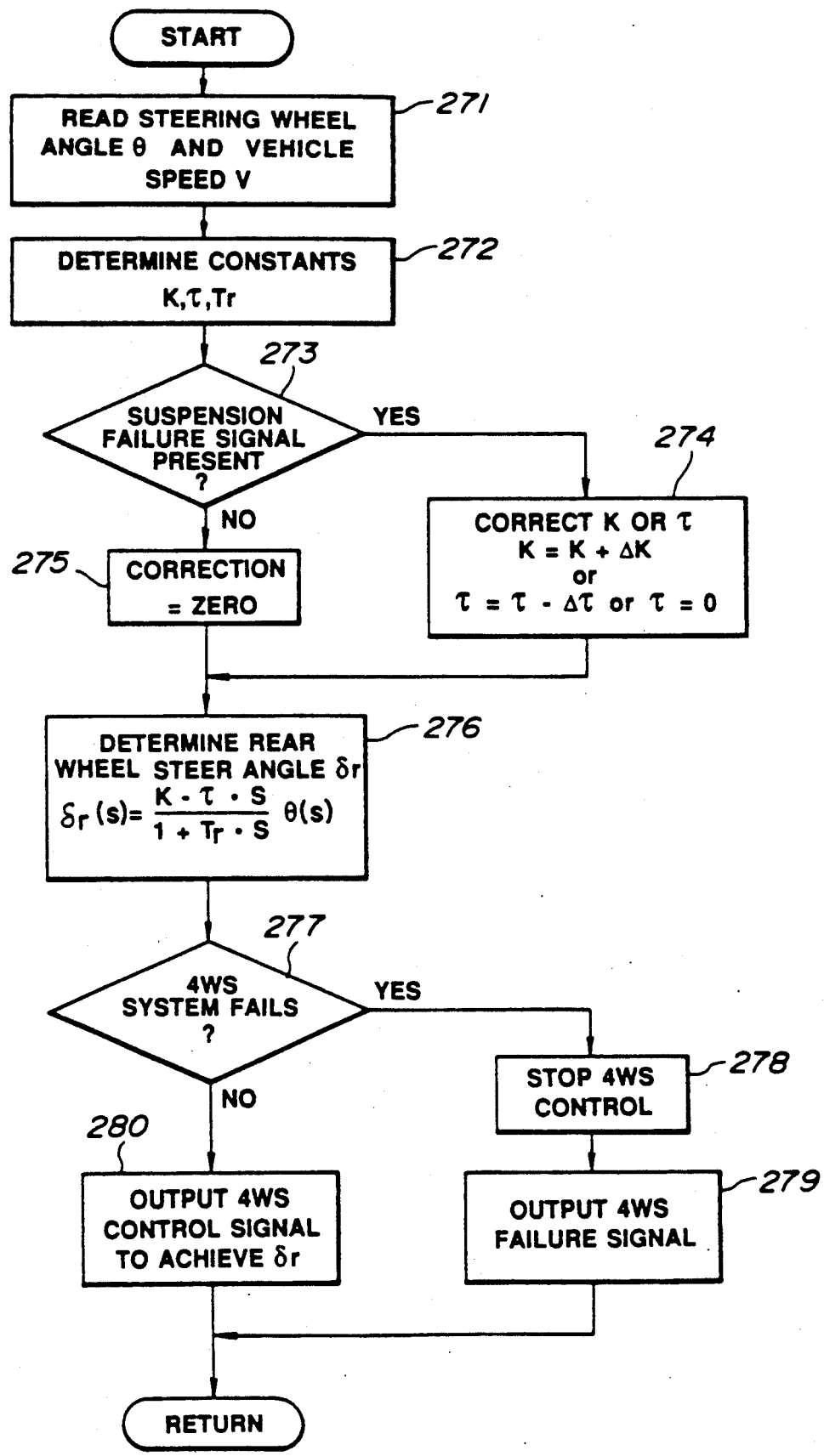
FIG. 9 is a flow chart showing a 4WS control proecedure of the second embodiment.

The 4WS control procedure shown in FIG. 9 is almost the same as that of the first embodiment shown in FIG. 4. Steps 271, 272 and 274-280 are substantially the same as steps 71, 72 and 74-80, respectively. In step 273 of the second embodiment, the controller 217 checks the suspension failure signal instead of the 4WD failure signal. If the suspension failure signal is present, then the controller 217 proceeds from step 273 to step 274. If the suspension system is normal, then the controller 217 proceeds from step 273 to step 275. In step 279, the 4WS failure signal is delivered to the suspension control section 217b.

When the suspension control system is abnormal, and the 4WS system is normal the control system of the second embodiment varies the rear wheel steer angle in such a direction as to increase the amount of same-direction rear wheel steering, or to decrease the opposite-direction rear wheel steering in the same manner as in the first embodiment. Therefore, the control system of the second embodiment can maintain or improve the vehicle directional stability by increasing the understeer tendency in spite of the failure of the suspension control system.

Figure 10A:
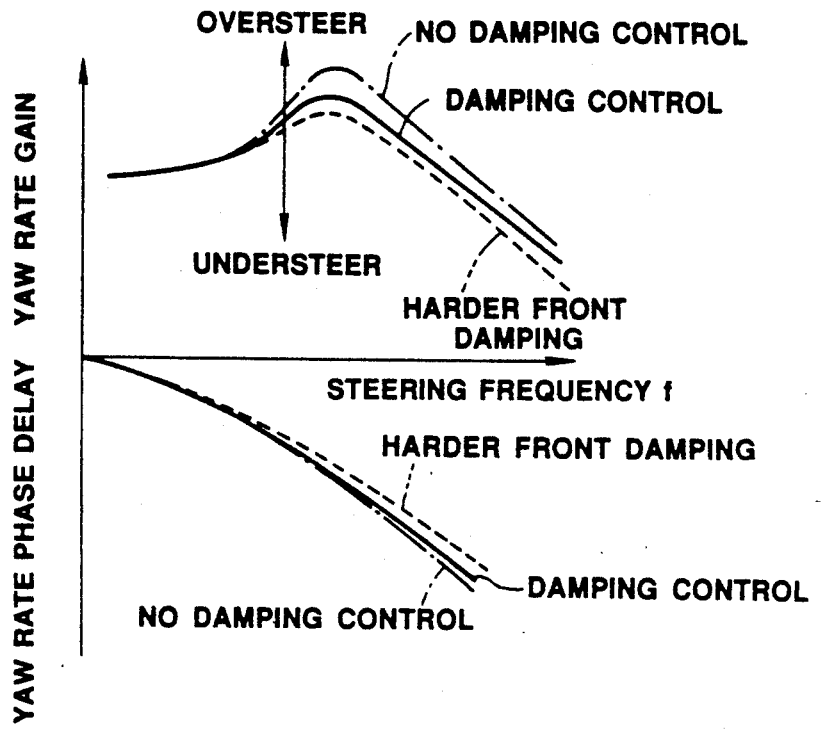
FIGS. 10A and 10B are graphs showing steering response characteristics obtained by the suspension control and the steering control of the second embodiment.
Figure 10B:
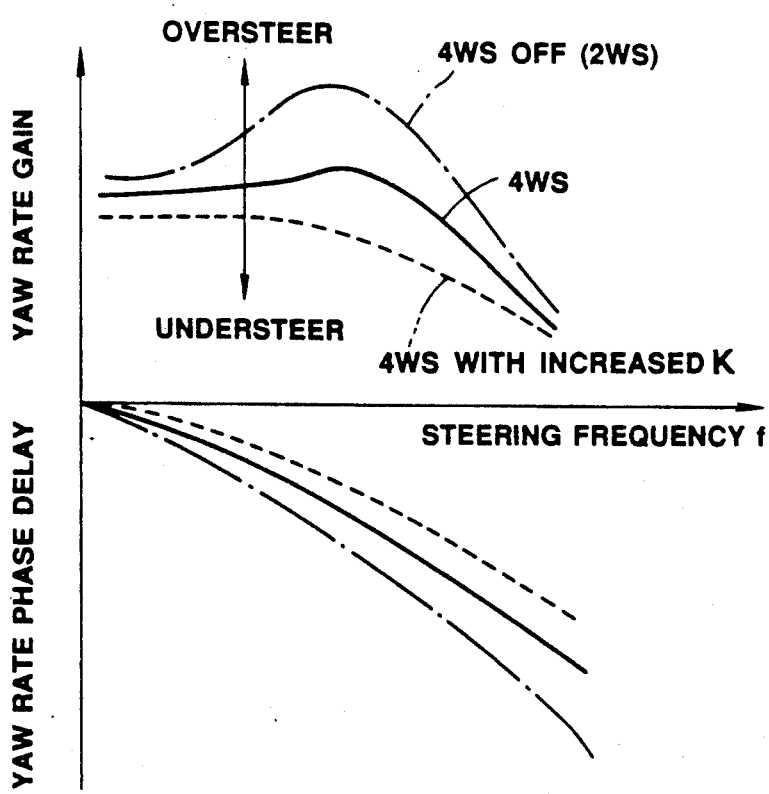

FIGS. 10A and 10B show effects of the control system of the second embodiment.

When the front suspension damping force is increased with respect to the rear suspension damping force, the transient wheel load transfer in the front wheels is increased relatively during cornering and the front wheel cornering force is temporarily decreased so that the understeer tendency is increased and the directional stability is improved. Therefore, the control system of the second embodiment increases the understeer tendency by increasing the front suspension damping force, as shown by with short dashes in FIG. 10A, when the 4WS system becomes abnormal.

When, for example, the suspension control system becomes abnormal and unable to increase the damping force during rolling, the roll angle of the vehicle tends to increase, and the steering characteristic of the vehicle tends to become unstable by the influence of "roll steer" and other factors. In such a case, the control system of the second embodiment can maintain or improve the vehicle stability by adjusting the control characteristic of the 4WS system. When the control system increases the proportional gain K of the rear wheel steering, the steady state gain and the phase delay of the yaw rate are lowered especially in a high speed range from solid line curves to the curves with short dashes shown in FIG. 10B, and accordingly the vehicle stability is increased.

When the 4WS system becomes abnormal and the steering mode is reduced to two wheel steering mode, the understeer tendency is decreased and the steering response gain of the vehicle is enhanced as shown by in FIG. 10B so that the driver feels an unnatural feeling. The control system of the second embodiment can prevent such an unnatural feeling by hardening the front suspension.

What is claimed is:

1. A vehicle equipped with a fail-safe control system comprising:
    a first control system comprising a steering system for steering said vehicle and first controlling means for controlling a condition of said steering system,
    a second control system comprising a drive system for driving said vehicle, a suspension system for supporting a vehicle body of said vehicle on wheels of said vehicle, and second controlling means for controlling a condition of at least one of said drive system and said suspension system; and
    fail-safe means connected with said first and second control systems for adjusting said first control system when a failure is detected in said second control system and adjusting said second control system when a failure is detected in said first control system.

2. A vehicle according to claim 1 wherein:
said first controlling means comprises means for controlling a steer angle of said vehicle, and said second controlling means comprises means for controlling a condition affecting a steering characteristic of said vehicle; and
said fail-safe means comprises means for adjusting said first controlling means so as to improve the directional stability of said vehicle when a failure is detected in said second control system and said first control system remains normal, and adjusting said second controlling means so as to improve said directional stability when a failure is detected in said first control system and said second control system remains normal.

3. A vehicle according to claim 2 wherein said vehicle has front wheels and rear wheels and said second controlling means comprises means for controlling one of a driving force distribution between the front wheels and rear wheels, and a suspension characteristic.

4. A vehicle according to claim 3 wherein said drive system is a four wheel drive system with a variable driving force distribution ratio defined as the ratio of the driving force transmitted to said front wheels, to a driving force transmitted to said rear wheels, and said controlling means comprises means for controlling said driving force distribution ratio.

5. A vehicle according to claim 4 wherein said fail-safe means comprises means for increasing said driving force distribution ratio when a failure is detected in said first control system.

6. A vehicle according to claim 5 wherein said fail-safe means comprises means for adjusting said first control system so as to decrease the steering response gain of said vehicle when a failure is detected in said second control system.

7. A vehicle according to claim 6 wherein:
said steering system is a four wheel steering system;
said first controlling means comprises means for controlling the rear wheel steer angle of said vehicle; and
said fail-safe means comprises means for varying said rear wheel steer angle in such a direction as to increase the amount by which said rear wheels of said vehicle are steered in a direction identical to a steering direction of said front wheels of said vehicle and to decrease the amount by which said rear wheels are steered in a direction opposite to the steering direction of said front wheels.

8. A vehicle according to claim 7 further comprising first sensor means for sensing a steering wheel angle of said vehicle and second sensor means for sensing the speed of said vehicle, wherein said first controlling means is connected with said first and second sensor means for producing a rear wheel steer angle control signal which is a predetermined function of said steering wheel angle and parameters dependent on said vehicle speed, and said fail-safe means comprises means for adjusting said function when a failure is detected in said second control system.

9. A vehicle according to claim 8 further comprising third sensor means for sensing an operating condition of said vehicle and producing a sensor signal, wherein said second controlling means is connected with said third sensor means and comprises means for producing a driving force distribution control signal which is a predetermined control function of said sensor signal of said third sensor means, and said fail-safe means comprises means for adjusting said control function of said second controlling means so as to increase said driving force transmitted to said front wheels relative to said driving force transmitted to said rear wheels.

10. A vehicle according to claim 9 wherein:
said first controlling means comprises first failure detecting means for detecting a failure in said first control system and producing a first failure signal when a failure is detected in said first control system, and first stopping means for stopping a control action of said first controlling means and holding said rear wheel steer angle equal to zero when said first failure signal is present;
said second controlling means comprises second failure detecting means for detecting a failure in said second control system and producing a second failure signal when a failure is detected in said second control system, and second stopping means for stopping a control action of said second controlling means and holding said driving force distribution ratio at a predetermined fixed value when said second failure signal is present; and
said fail-safe means is connected with said first and second failure detecting means and comprises means for adjusting said first controlling means when said second failure signal is produced, and adjusting said second controlling means when said first failure signal is produced.

11. A vehicle according to claim 3 wherein said suspension system has a variable suspension characteristic, said second controlling means comprises means for controlling said suspension characteristic, and said fail-safe means comprises means for adjusting said suspension characteristic when a failure is detected in said first control system.

12. A vehicle according to claim 11 wherein said fail-safe means comprises means for adjusting said suspension characteristic of said suspension system so as to increase an understeer tendency of said vehicle.

13. A vehicle according to claim 12 wherein said vehicle has a front suspension and a rear suspension and said fail-safe means comprises means for adjusting said suspension system so as to harden the front suspension relative to the rear suspension.

14. A vehicle according to claim 12 wherein said suspension system comprises adjustable shock absorbers having a variable damping characteristic, and said second controlling means comprises means for controlling said damping characteristic.

15. A vehicle according to claim 14 wherein said fail-safe means comprises means for increasing the ratio of the damping force of the front suspension to the damping force of the rear suspension when a failure is detected in said first control system.

16. A vehicle according to claim 15 wherein said fail-safe means comprises means for adjusting said first control system so as to decrease the steering response gain of said vehicle when a failure is detected in said second control system.

17. A vehicle according to claim 16 wherein:
said steering system is a four wheel steering system;
said first controlling means comprises means for controlling the rear wheel steer angle of said steering system said fail-safe means comprises means for varying said rear wheel steer angle in such a direction as to increase the amount by which said rear wheels are steered in a direction identical to a steering direction of said front wheels, and to decrease the amount by which said rear wheels are steered in a direction opposite to the steering direction of said front wheels.

18. A vehicle according to claim 17 wherein:

said first controlling means comprises first failure detecting means for detecting a failure in said first control system and producing a first failure signal when a failure is detected, and first stopping means for stopping a control action of said first controlling means and holding said rear wheel steer angle equal to zero when said first failure signal is present;

said second controlling means comprises second failure detecting means for detecting a failure in said second control system and producing a second failure signal when a failure is detected in said second control system, and second stopping means for stopping a control action of said second controlling means and holding said suspension system at a predetermined state when said second failure signal is present; and said fail-safe means is connected with said first and second failure detecting means and comprises means for adjusting said first controlling means when said second failure signal is produced, and adjusting said second controlling means when said first failure signal is produced.

19. A vehicle according to claim 1 wherein:

said first control system comprises a first actuating means for varying a steer angle of the vehicle;

said first controlling means comprises means for controlling said first actuating means by sending a first control signal to said first actuating means;

said second control system comprises a second actuating means for varying a condition of at least one of said drive system and said suspension system; and said second controlling means comprises means for controlling said second actuating means by sending a second control signal to said second actuating means.

* * * * *